(12) United States Patent
Nguyen et al.

(10) Patent No.: US 11,856,557 B2
(45) Date of Patent: Dec. 26, 2023

(54) ON-DEMAND SENSING BASED ON SIDELINK RESOURCE REEVALUATION

(71) Applicant: QUALCOMM Incorporated, San Diego, CA (US)

(72) Inventors: Tien Viet Nguyen, Bridgewater, NJ (US); Kapil Gulati, Belle Mead, NJ (US); Gabi Sarkis, San Diego, CA (US); Sourjya Dutta, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 185 days.

(21) Appl. No.: 17/451,321

(22) Filed: Oct. 18, 2021

(65) Prior Publication Data
US 2022/0124681 A1    Apr. 21, 2022

Related U.S. Application Data

(60) Provisional application No. 63/093,667, filed on Oct. 19, 2020.

(51) Int. Cl.
*H04W 72/02* (2009.01)
*H04W 28/26* (2009.01)
(Continued)

(52) U.S. Cl.
CPC ......... *H04W 72/02* (2013.01); *H04W 28/26* (2013.01); *H04W 52/0229* (2013.01); *H04W 72/0446* (2013.01); *H04W 72/20* (2023.01)

(58) Field of Classification Search
CPC . H04W 72/02; H04W 28/26; H04W 52/0229; H04W 72/0446; H04W 72/20; H04W 74/0808; Y02D 30/70
See application file for complete search history.

(56) References Cited

U.S. PATENT DOCUMENTS

2020/0296690 A1* 9/2020 Lee .................... H04W 4/40
2021/0037468 A1* 2/2021 Huang ............... H04W 76/23
(Continued)

FOREIGN PATENT DOCUMENTS

GB          2552792 A     2/2018
KR    20200133565 A  * 10/2020
(Continued)

OTHER PUBLICATIONS

US 11,678,196 B2, 06/2023, Farag (withdrawn)*
(Continued)

*Primary Examiner* — Wutchung Chu
(74) *Attorney, Agent, or Firm* — Arent Fox, LLP

(57) ABSTRACT

Apparatus, methods, and computer-readable media for on-demand sensing based on sidelink resource reevaluation are disclosed herein. An example method of wireless communication at a first user equipment (UE) includes selecting first sidelink resources for one or more transmissions based on partial sensing or resource selection independent of a sensing operation. The example method also includes receiving, over a sidelink channel, a resource reservation from a second UE, the resource reservation indicating reservation of resources overlapping with at least a portion of the first sidelink resources of the first UE. The example method also includes performing a resource reevaluation for one or more slots when the resource reservation indicates the reservation of resources overlapping with the at least a portion of the first sidelink resources of the first UE. The example method also includes selecting second sidelink resources for the one or more transmissions based on the resource reevaluation.

28 Claims, 9 Drawing Sheets

(51) Int. Cl.
*H04W 72/0446* (2023.01)
*H04W 52/02* (2009.01)
*H04W 72/20* (2023.01)

(56) References Cited

U.S. PATENT DOCUMENTS

| | | | |
|---|---|---|---|
| 2021/0227602 A1* | 7/2021 | Li | H04W 76/28 |
| 2021/0250954 A1* | 8/2021 | Li | H04W 72/56 |
| 2022/0030575 A1* | 1/2022 | Farag | H04L 5/0053 |
| 2022/0046596 A1* | 2/2022 | Chen | H04W 72/02 |
| 2022/0053460 A1* | 2/2022 | Yu | H04W 76/28 |
| 2022/0078758 A1* | 3/2022 | Lee | H04W 72/20 |
| 2022/0086803 A1* | 3/2022 | Li | H04W 72/0446 |
| 2022/0095280 A1* | 3/2022 | Farag | H04W 72/20 |
| 2022/0124681 A1* | 4/2022 | Nguyen | H04W 72/02 |
| 2022/0312479 A1* | 9/2022 | Farag | H04W 74/0808 |
| 2022/0394613 A1* | 12/2022 | Kwon | H04W 72/51 |
| 2022/0394735 A1* | 12/2022 | Lee | H04W 72/1263 |
| 2023/0141004 A1* | 5/2023 | Hong | H04W 76/28 370/311 |
| 2023/0319578 A1* | 10/2023 | Farag | H04W 72/044 370/330 |

FOREIGN PATENT DOCUMENTS

| | | |
|---|---|---|
| WO | 2018/145067 A1 | 8/2018 |
| WO | 2020/173536 A1 | 9/2020 |

OTHER PUBLICATIONS

Yu et a. U.S. Appl. No. 63/065,548, filed Aug. 14, 2020 (Year: 2020).*
Farag et al. U.S. Appl. No. 63/083,541, filed Sep. 25, 2020 (Year: 2020).*
Farag et al. U.S. Appl. No. 63/056,329, filed Jul. 24, 2020 (Year: 2020).*
International Search Report and Written Opinion dated Feb. 14, 2022 from corresponding PCT Application No. PCT/US2021/071930.

* cited by examiner

ON-DEMAND SENSING BASED ON SIDELINK RESOURCE REEVALUATION

CROSS REFERENCE TO RELATED APPLICATION(S)

This application claims the benefit of U.S. Provisional Patent Application Ser. No. 63/093,667, entitled "ON-DEMAND SENSING BASED ON SIDELINK RESOURCE REEVALUATION" and filed on Oct. 19, 2020, which is expressly incorporated by reference herein in its entirety.

BACKGROUND

Technical Field

The present disclosure generally relates to communication systems, and more particularly, to on-demand sensing based on sidelink resource reevaluation for vehicle-to-everything (V2X) or other device-to-device (D2D) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Aspects of wireless communication may include direct communication between devices, such as in V2X and/or other D2D communication. There exists a need for further improvements in V2X and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For sidelink communication, a large bulk of power is consumed on a sensing-based resource selection mechanism. The sensing operation can ensure packet transmissions over a communication medium are collision free. The sensing operation can obtain incoming control information from other sidelink wireless devices, which announce future packet transmissions on reserved resources. The sensing-based resource selection mechanism requires the wireless device to be continuously monitoring the communication medium and decoding all incoming control information, which involves a significant amount of power consumption by the wireless device.

Power consumption and reliability of sidelink communication may be improved if a wireless device performs on-demand sensing based on sidelink resource reevaluation. Aspects presented herein enable the wireless device to wake up on demand to perform a random selection of sidelink resources while reducing the power consumption by the wireless device, and trigger a sidelink resource reevaluation to reevaluate any selected sidelink resources upon receipt of incoming sidelink control information indicating a potential resource collision while increasing the reliability of sidelink communication.

The present disclosure provides for a user equipment (UE) to perform partial sensing and/or random selection of sidelink resources prior to selection for a first transmission and/or one or more retransmissions without performing a full sensing-based resource selection mechanism. After selection of sidelink resources, the UE can receive, over a sidelink channel, control information that may indicate whether the selected sidelink resources are in conflict with resources reserved by other UEs. The UE can reevaluate the selected sidelink resources to select new resources that do not conflict with the existing reserved resources. By using on-demand sensing via partial sensing and/or random resource selection, the wireless device may reduce the amount of power consumed to perform sidelink resource selection while increasing the reliability of sidelink communication with the sidelink resource reevalution.

In an aspect of the disclosure, a method, a computer-readable medium, and an apparatus are provided. The apparatus is configured to select first sidelink resources for one or more transmissions based on one or more of partial sensing or resource selection independent of a sensing operation. The apparatus is also configured to receive, over a sidelink channel, a resource reservation from a second UE, the resource reservation indicating reservation of resources overlapping with at least a portion of the first sidelink resources of the first UE. The apparatus is also configured to perform a resource reevaluation for one or more slots when the resource reservation indicates the reservation of resources overlaps with the at least a portion of the first sidelink resources of the first UE. The apparatus is also configured to select second sidelink resources for the one or more transmissions based on the resource reevaluation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
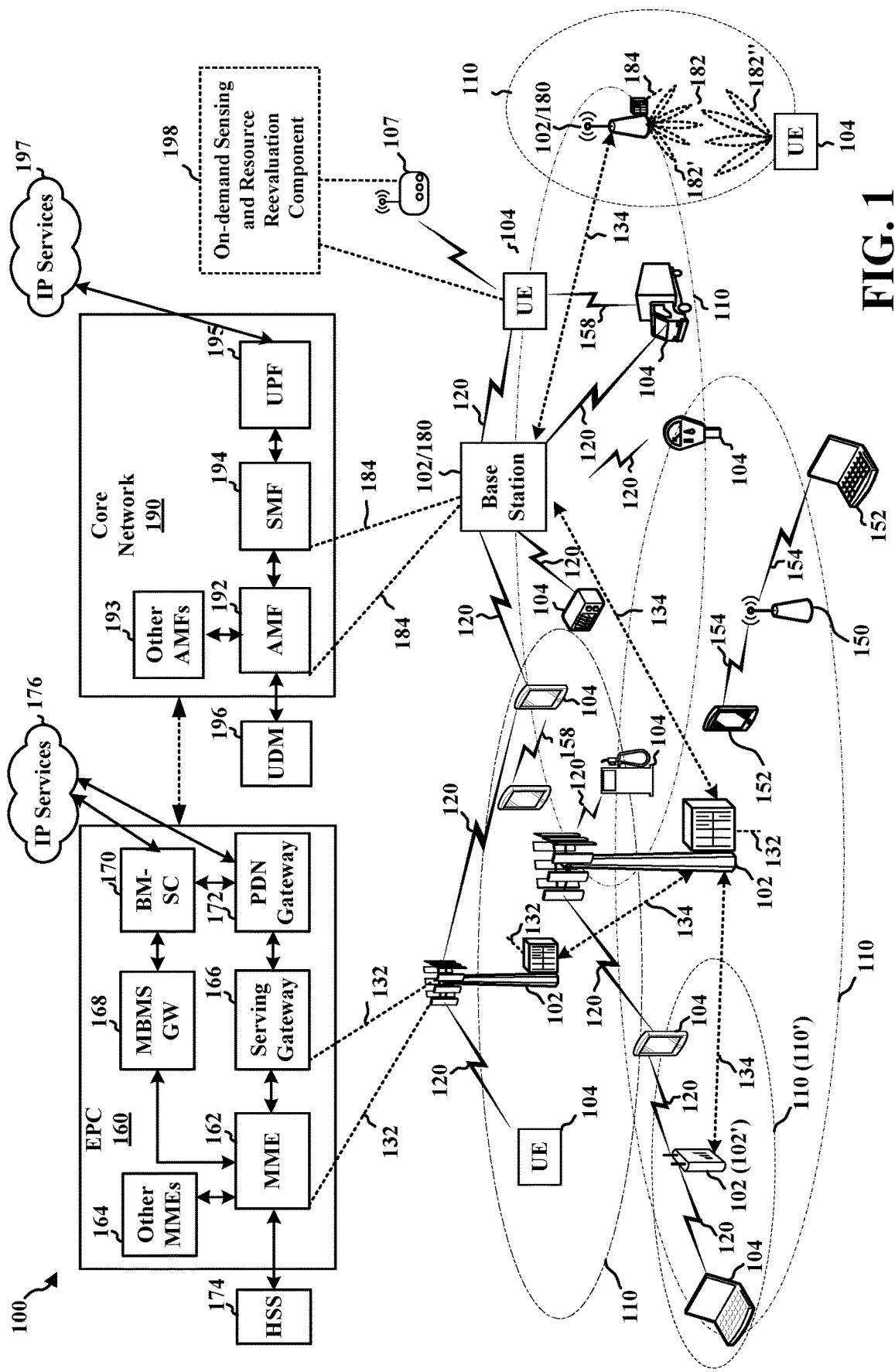
FIG. 1 is a diagram illustrating an example of a wireless communications system and an access network, in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including device(s) configured to perform the resource reevaluation aspects described herein. Some wireless communication may be exchanged directly between wireless devices based on sidelink. The communication may be based on vehicle-to-anything (V2X) or other device-to-device (D2D) communication, such as Proximity Services (ProSe), etc. Sidelink communication may be exchanged based on a PC5 interface, for example.

For sidelink communication, a large bulk of power is consumed on a sensing-based resource selection mechanism. The sensing operation can ensure packet transmissions over a communication medium are collision free. The sensing operation can obtain incoming control information from other sidelink wireless devices, which announce future packet transmissions on reserved resources. The sensing-based resource selection mechanism requires the wireless device to be continuously monitoring the communication medium and decoding all received control information, which involves a significant amount of power consumption by the wireless device.

Power consumption and reliability of sidelink communication may be improved if a wireless device performs on-demand sensing based on sidelink resource reevaluation. Aspects presented herein enable the wireless device to wake up on demand to perform partial sensing of sidelink resources prior to selection and/or a random selection of sidelink resources while reducing the power consumption by the wireless device. When performing partial sensing, the wireless device may selectively sense a subset of sidelink resources and, thus, may reduce power consumption in comparison to monitoring the full set of sidelink resources. The wireless device can trigger a sidelink resource reevaluation after selection of sidelink resources to reevaluate any of the selected sidelink resources upon receipt of incoming sidelink control information indicating a potential resource collision with resources reserved by other UEs while increasing the reliability of sidelink communication.

Aspects presented herein provide for a user equipment (UE) to perform partial sensing of sidelink resources prior to selection and/or random selection of sidelink resources for a first transmission and/or one or more retransmissions without performing a full sensing-based resource selection mechanism. After selection of sidelink resources, the UE can receive, over a sidelink channel, control information that may indicate whether the selected sidelink resources are in conflict with resources reserved by other UEs. The UE can reevaluate the selected sidelink resources to select new resources that do not conflict with the existing reserved resources. By using on-demand sensing, the wireless device may reduce the amount of power consumed to perform sidelink resource selection while increasing the reliability of sidelink communication with the sidelink resource reevaluation.

In some examples, a UE 104 may be configured to manage one or more aspects of wireless communication by facilitating on-demand sensing based on sidelink resource reevaluation. As an example, in FIG. 1, the UE 104, the RSU 107, and/or other devices communicating based on sidelink may include an on-demand sensing and resource reevaluation component 198 configured to select first sidelink resources for one or more transmissions based on one or more of partial sensing or resource selection independent of a sensing operation. The apparatus is also configured to receive, over a sidelink channel, a resource reservation from a second UE, the resource reservation indicating reservation of resources that overlaps with at least a portion of the first sidelink resources of the first UE. The apparatus is also configured to perform a resource reevaluation for one or more slots when the resource reservation indicates the reservation of resources overlaps with the at least a portion of the first sidelink resources of the first UE. The apparatus is also configured to select second sidelink resources for the one or more transmissions based on the resource reevaluation. Further related aspects and features are described in more detail in connection with FIGS. 4-7. Although the following description may be focused on 5G NR, the concepts described herein may be applicable to other similar areas, such as LTE, LTE-A, CDMA, GSM, and other wireless technologies.

Figure 2:
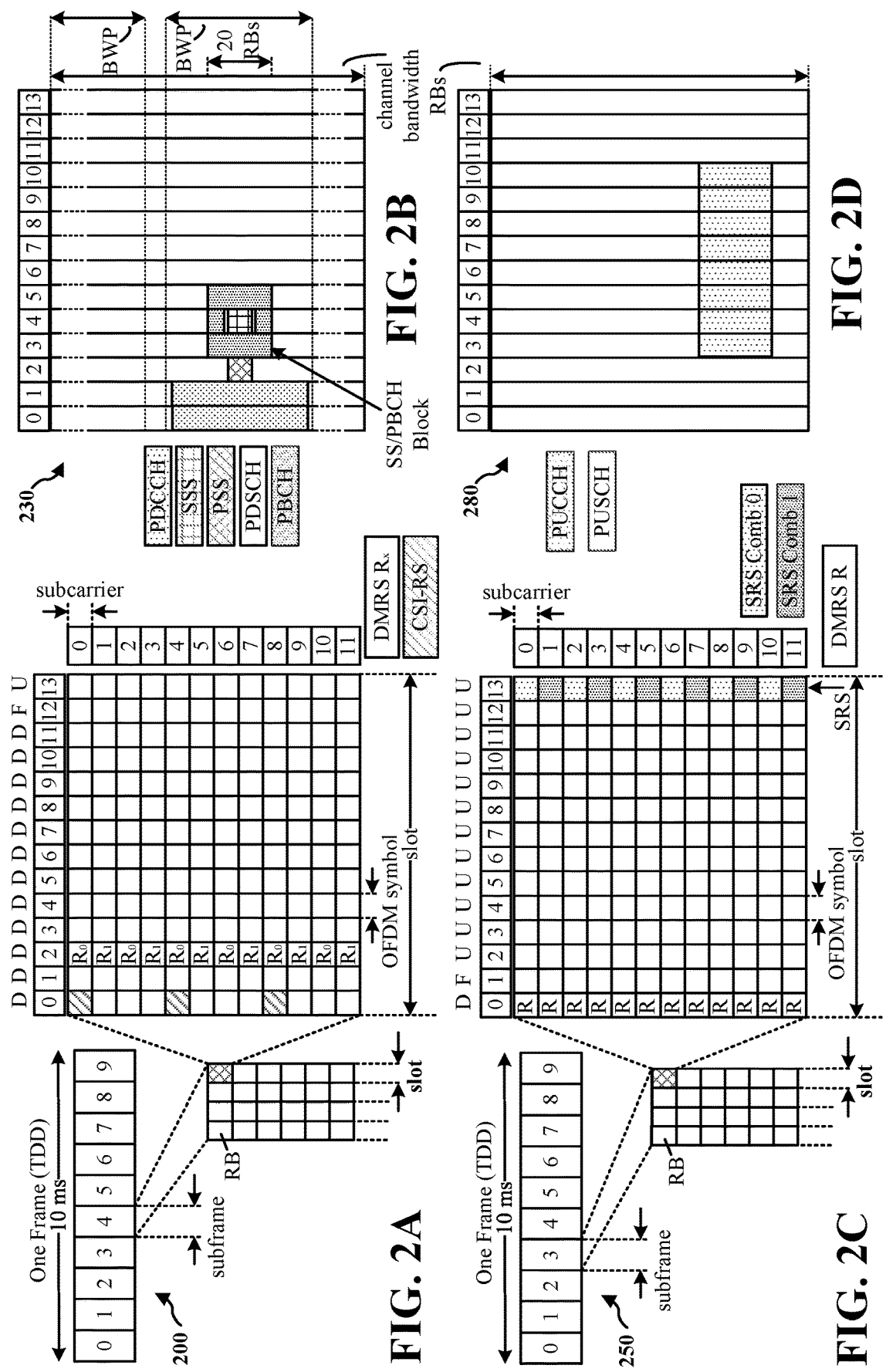
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

The wireless communications system and access network 100 in FIG. 1 (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Further, although the present disclosure may focus on vehicle-to-pedestrian (V2P) communication and pedestrian-to-vehicle (P2V) communication, the concepts and various aspects described herein may be applicable to other similar areas, such as D2D communication, IoT communication, vehicle-to-everything (V2X) communication, or other standards/protocols for communication in wireless/access networks.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 10x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
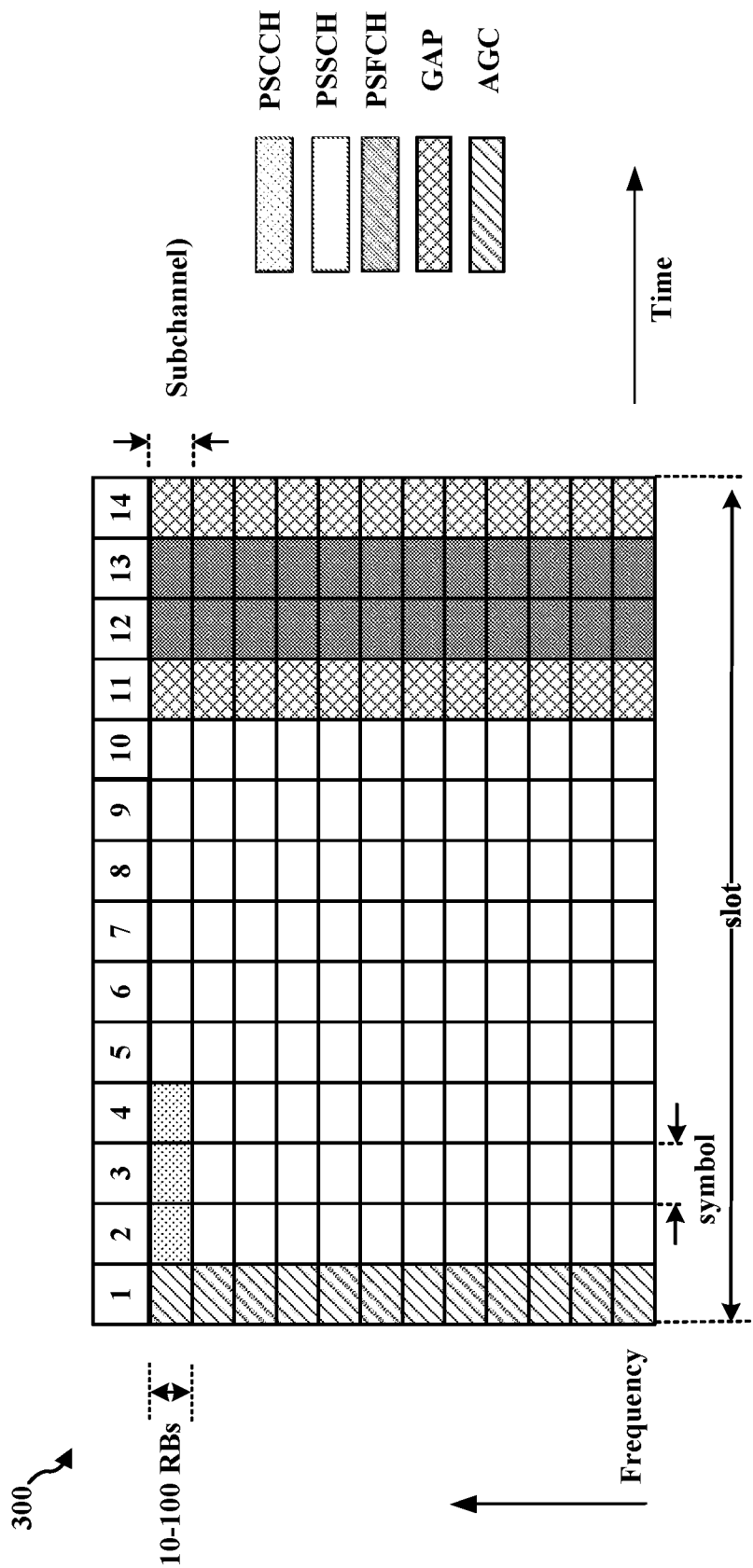
FIG. 3 illustrates example aspects of a sidelink slot structure.

FIG. 3 illustrates example diagram 300 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI).

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Diagram 300 also illustrates multiple subchannels, where each subchannel may include multiple RBs. For example, one subchannel in sidelink communication may include 10-100 RBs. As illustrated in FIG. 3, the first symbol of a subframe may be a symbol for automatic gain control (AGC). Some of the REs may include control information, e.g., along with PSCCH and/or PSSCH. The control information may include Sidelink Control Information (SCI). For example, the PSCCH can include a first-stage SCI. A PSCCH resource may start at a first symbol of a slot, and may occupy 1, 2 or 3 symbols. The PSCCH may occupy up to one subchannel with the lowest subcarrier index. FIG. 3 also illustrates symbol(s) that may include PSSCH. The symbols in FIG. 3 that are indicated for PSCCH or PSSCH indicate that the symbols include PSCCH or PSSCH REs. Such symbols corresponding to PSSCH may also include REs that include a second-stage SCI and/or data. At least one symbol may be used for feedback (e.g., PSFCH), as described herein. As illustrated in FIG. 3, symbols 12 and 13 are indicated for PSFCH, which indicates that these symbols include PSFCH REs. In some aspects, symbol 12 of the PSFCH may be a duplication of symbol 13. A gap symbol prior to and/or after the feedback may be used for turnaround between reception of data and transmission of the feedback. As illustrated in FIG. 3, symbol 10 includes a gap symbol to enable turnaround for feedback in symbol 11. Another symbol, e.g., at the end of the slot (symbol 14) may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the PSCCH, PSSCH, PSFCH, and gap symbols may be different than the example illustrated in FIG. 3.

Figure 4:
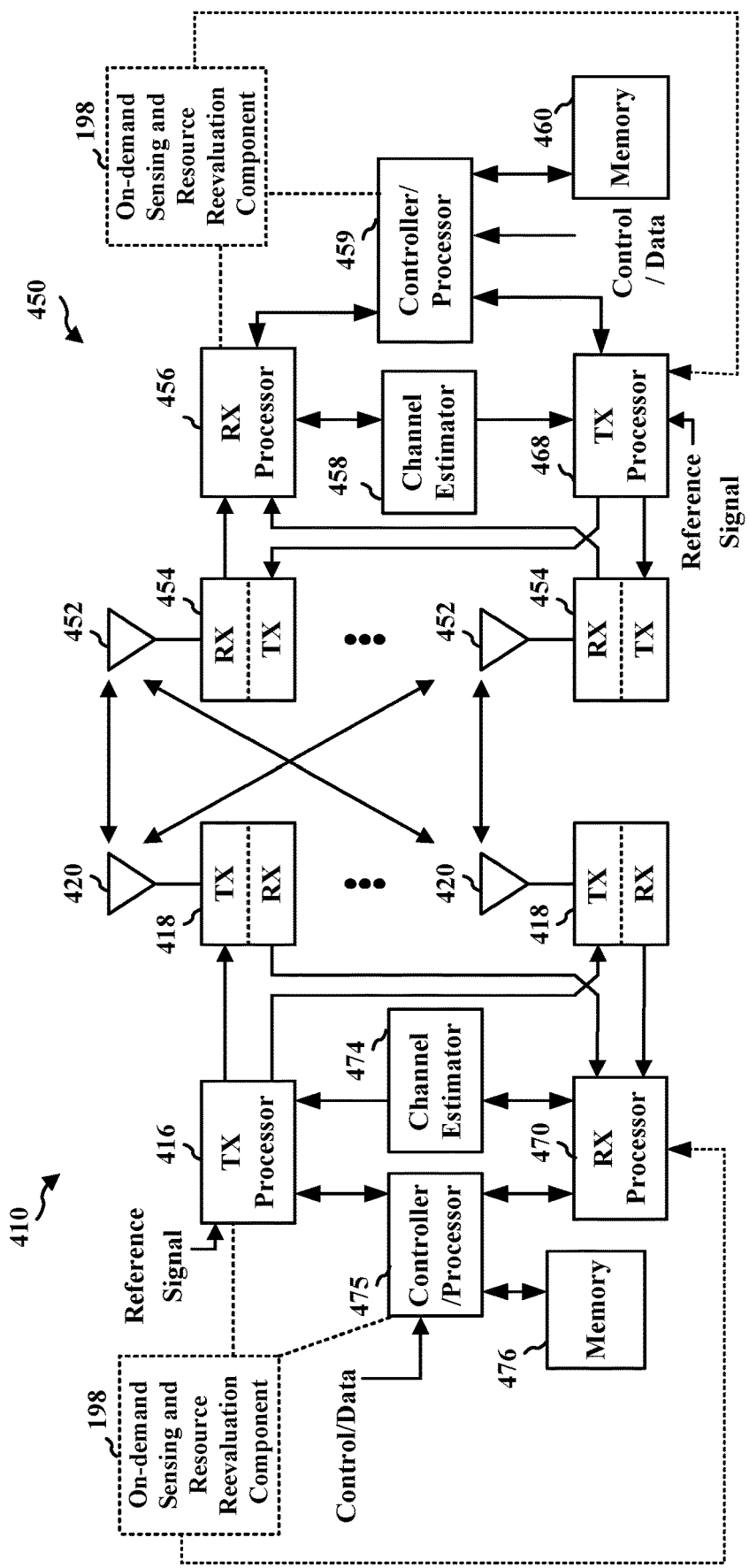
FIG. 4 is a diagram illustrating an example of a first device and a second device involved in wireless communication based, e.g., on V2X and/or other D2D communication, in accordance with aspects presented herein.

FIG. 4 is a block diagram 400 of a first wireless communication device 410 in communication with a second wireless communication device 450, e.g., via V2X or other D2D communication. The communication may be based, e.g., on sidelink using a PC5 interface. The transmitting device 410 and the 450 may comprise a UE, an RSU, etc. Packets may be provided to a controller/processor 475 that implements layer 4 and layer 2 functionality. Layer 4 includes a radio resource control (RRC) layer, and layer 2 includes a packet data convergence protocol (PDCP) layer, a radio link control (RLC) layer, and a medium access control (MAC) layer.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418TX. Each transmitter 418TX may modulate an RF carrier with a respective spatial stream for transmission.

At the device 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 410. These soft decisions may be based on channel estimates computed by the channel estimator 458. The soft decisions are then decoded and deinterleaved to recover the data and control signals that were originally transmitted by device 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing. The controller/processor 459 is also responsible for error detection using an ACK and/or NACK protocol to support HARQ operations.

Similar to the functionality described in connection with the transmission by device 410, the controller/processor 459 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing.

The spatial streams generated by the TX processor 468 may be provided to different antenna 452 via separate transmitters 454TX. Each transmitter 454TX may modulate an RF carrier with a respective spatial stream for transmission.

The transmission is processed at the device 410 in a manner similar to that described in connection with the receiver function at the device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing. The controller/processor 475 is also responsible for error detection using an ACK and/or NACK protocol to support HARQ operations.

At least one of the TX processor 468, the RX processor 456, or the controller/processor 459 of device 450 or the TX 416, the RX processor 470, or the controller/processor 475 may be configured to perform aspects described in connection with the on-demand sensing and resource reevaluation component 198 of FIG. 1.

Figure 5:
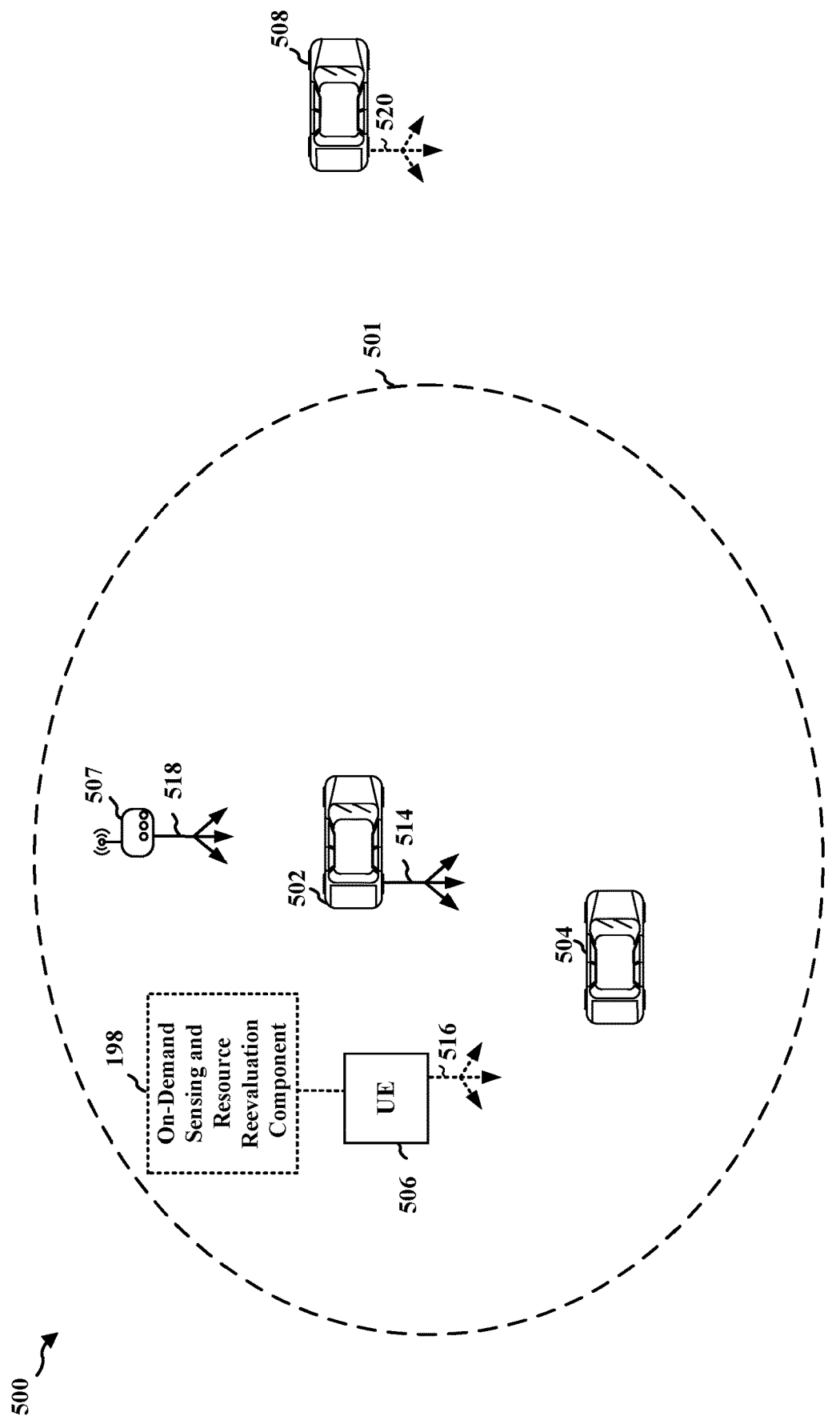
FIG. 5 illustrates example aspects of V2X and/or D2D communication between devices, in accordance with aspects presented herein.

FIG. 5 illustrates an example 500 of wireless communication between devices based on V2X or other D2D communication. The communication may be based on a slot structure. As an example, the slot structure may comprise aspects described in connection with FIG. 2. For example, UE 502 may transmit a transmission 514, e.g., comprising a control channel and/or a corresponding data channel, that may be received by UEs 504, 506, 508. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 502, 504, 506, 508 may each be capable of operating as a transmitting device in addition to operating as a receiving device. Thus, UEs 506, 508 are illustrated as transmitting a transmissions 516, 520. The transmissions 514, 516, 520 may be broadcast or multicast to nearby devices. For example, UE 502 may transmit communication intended for receipt by other UEs within a range 501 of UE 502. Additionally/alternatively, RSU 507 may receive communication from and/or transmit communication to UEs 502, 504, 506, 508. One or more of the UEs 502, 504, 506, 508 or the RSU 507 may comprise an on-demand sensing and resource reevaluation component 198 as described in connection with FIG. 1.

Devices communicating based on V2X, or other D2D based communication, may determine a radio resource in the time and frequency domain that are used by other devices in order to select transmission resources that avoid (potential or actual) collisions with other devices. As an example in a first mode (e.g., Mode 1), resources may be assigned by a serving cell (or base station) for sidelink transmissions. In a second mode (e.g., Mode 2), individual devices may autonomously select resources for sidelink transmission, e.g., without a central entity such as a base station indicating the resources for the device. A first device may reserve the selected resources in order to inform other devices about the resources that the first device intends to use.

In some examples, the communication may be based on a sensing-based mechanism. For instance, when a UE selects a resource for a data transmission, the UE first determines whether resources are reserved by other UEs. The UE may use a sensing-based resource selection algorithm to estimate or determine which radio resources are in-use and/or reserved by others. The UE may receive resource reservation information based on a resource reservation field comprised in the SCI transmitted by other UEs. Thus, the UE may continuously decode SCI from other sidelink UEs. The SCI may include reservation information, e.g., indicating slots and RBs that a particular UE has selected for a future transmission. The UE may exclude resources that are overlapping with resources used and/or reserved by other UEs, and may select/reserve resources for a transmission from the resources that are not excluded. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Although the sensing operation can ensure future transmissions over a communication medium are collision free, the sensing-based resource selection mechanism requires the UE to be continuously monitoring the communication medium and decoding all received SCI, which involves a significant amount of power consumption by the UE. Power consumption and reliability of sidelink communication may be improved if the UE performs on-demand sensing based on sidelink resource reevaluation. Aspects presented herein enable the UE to wake up on demand to perform partial sensing of sidelink resources and/or a random selection of sidelink resources while reducing the power consumption by the UE, and, after selection of sidelink resources, trigger a sidelink resource reevaluation to reevaluate any of the selected sidelink resources upon receipt of incoming SCI indicating a potential resource collision with resources reserved by other UEs while increasing the reliability of sidelink communication.

Figure 6:
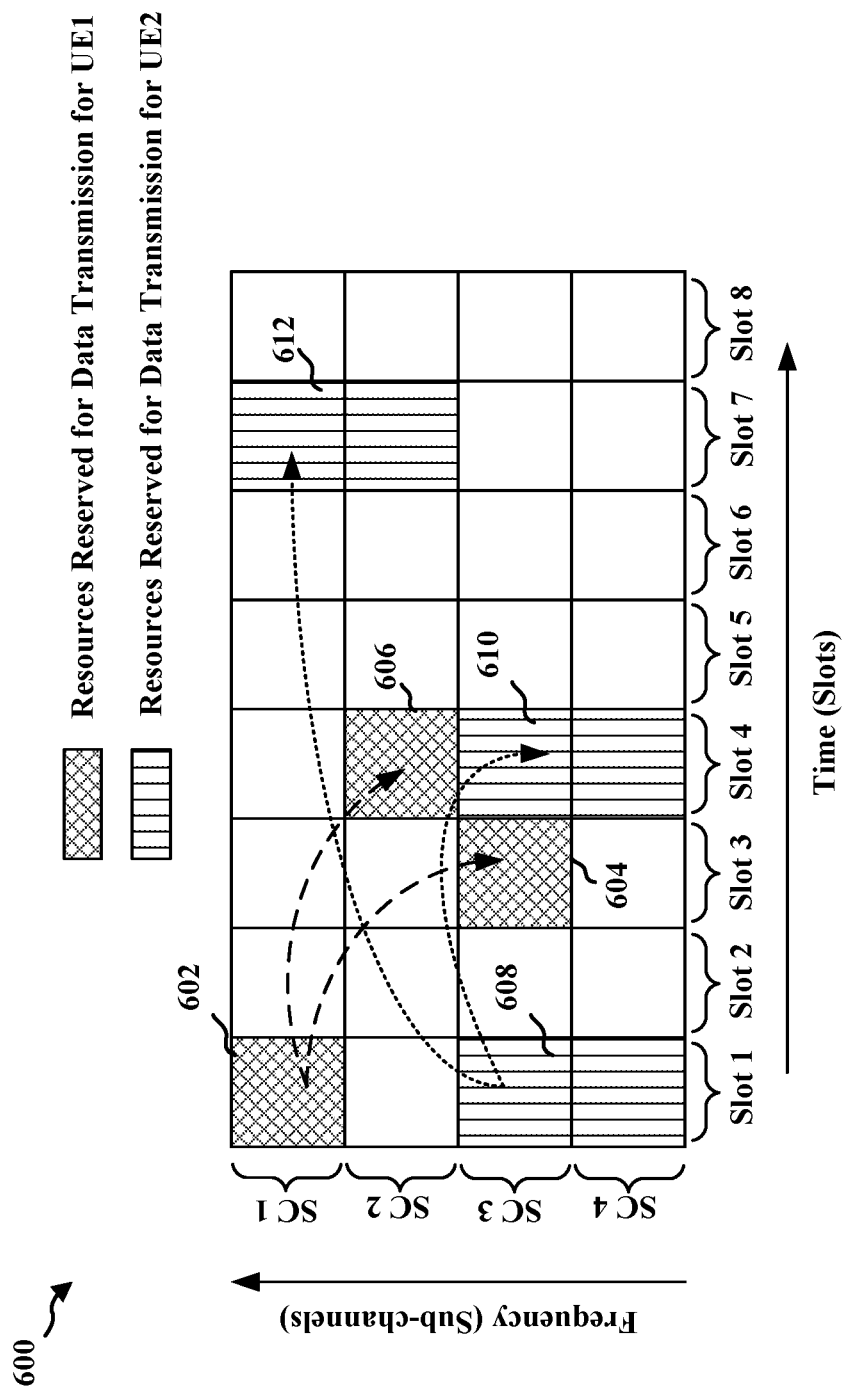
FIG. 6 illustrates examples of resource reservation for sidelink communication.

FIG. 6 is an example 600 of time frequency resources showing reservations for sidelink transmissions. The resource allocation for each UE may be in units of one or more sub-channels in the frequency domain (e.g., sub-channels SC 1 to SC 4), and may be based on one slot in the time domain. The UE may also use resources in a first slot (e.g., Slot 1) to perform an initial transmission, and may reserve resources in future slots for retransmissions (e.g., Slots 3, 4). In this example, two different future slots are being reserved by UE1 and UE2 for retransmissions. The resource reservation may be limited to a window of a pre-defined slots and sub-channels, such as an 8 time slots by 4 sub-channels window as shown in example 600, which provides 32 available resource blocks in total. This window may also be referred to as a resource selection window.

A first UE (denoted as "UE1") may reserve a sub-channel (e.g., SC 1) in a first slot (e.g., slot 1) for its initial data transmission 602, and may reserve additional future slots within the window for data retransmissions (e.g., 604 and 606). For example, UE1 may reserve sub-channel SC 3 at slot 3 and sub-channel SC 2 at slot 4 for future retransmissions as shown by FIG. 6. UE1 then transmits information regarding which resources are being used and/or reserved by it to other sidelink UE(s). UE1 may do so by including the reservation information in a resource reservation field of the SCI, e.g., a first stage SCI.

Also illustrated in FIG. 6 is a second UE (denoted as "UE2") that reserves resources in sub-channels SC 3 and SC 4 at time slot 1 for a first data transmission 608, and reserves resources for a first data retransmission 610 at time slot 4 using sub-channels SC 3 and SC 4, and reserves resources for a second data retransmission 612 at time slot 7 using sub-channels SC 1 and SC 2 as shown by FIG. 6. Similarly, UE2 may transmit the resource usage and reservation information to other sidelink UE(s), such as using the resource reservation field in the SCI.

While FIG. 6 illustrates resources being reserved for a first transmission and two retransmissions, the reservation may be for a first transmission and a single retransmission or only for a first transmission.

For sidelink communication, a sensing operation can ensure packet transmissions over a communication medium are collision free. The sensing operation can obtain incoming control information from other sidelink UEs, which announce future packet transmissions on reserved resources. For example, a third UE may consider resources reserved by other UEs within a sensing window, e.g., a time duration prior to resource selection during which the third UE monitors or stores resource reservations from other UEs, to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

In some aspects of the sensing-based resource selection mechanism, the UE may determine an associated signal measurement (such as a reference signal received power (RSRP)) for each resource reservation received by another UE. The UE may consider resources reserved in a transmission for which the UE measures an RSRP below a threshold to be available for use by the UE. The UE may reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources. For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 6, the UE may transmit SCI reserving resources 608, 610, and 612.

However, a large bulk of power is consumed on the sensing-based resource selection mechanism. The sensing-based resource selection mechanism requires the UE to be continuously monitoring the communication medium and decoding all received control information, which involves a significant amount of power consumption by the UE.

Power consumption and reliability of sidelink communication may be improved if the UE performs on-demand sensing based on sidelink resource reevaluation. Aspects presented herein enable the UE to wake up on demand to perform a random selection of sidelink resources while reducing the power consumption by the UE, and trigger a sidelink resource reevaluation to reevaluate any selected sidelink resources upon receipt of incoming sidelink control information indicating a potential resource collision while increasing the reliability of sidelink communication.

Figure 7:
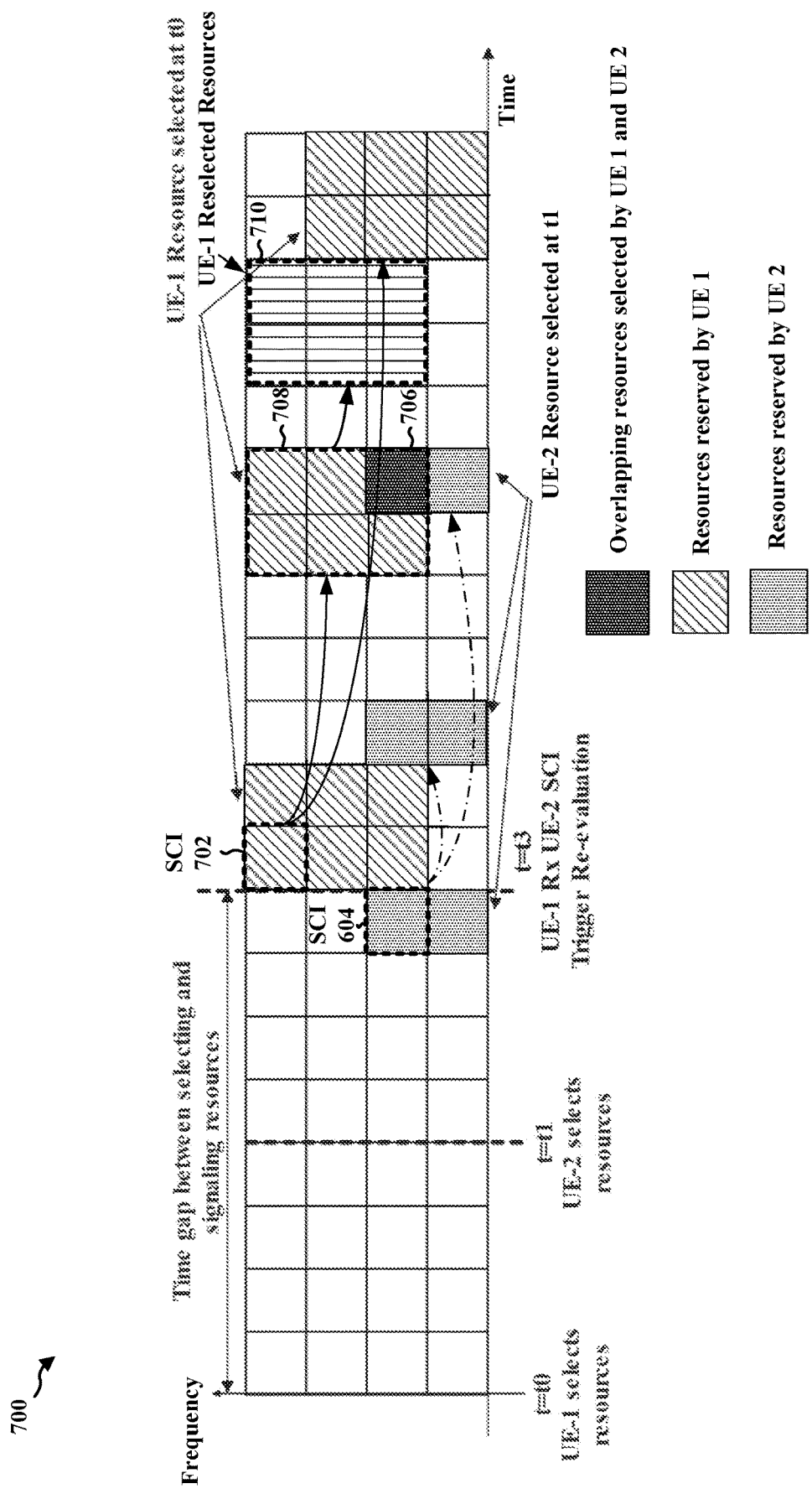
FIG. 7 illustrates an example of resource reevaluation for sidelink communication.

FIG. 7 illustrates an example of resource reevaluation for sidelink communication. There may be a time gap between the time resources are selected and the time of a first transmission. Based on control information received from other sidelink UEs indicating reservation of resources that may include at least some of the randomly selected resources such that a potential collision may exist with the randomly selected resources, the UE may be able to determine available candidate resources for a duration of time after the random selection by performing a sidelink resource reevaluation.

In FIG. 7, at time t0, a first UE (denoted as "UE-1") may randomly select first sidelink resources for one or more transmissions independent of performing a sensing operation. In some examples, the first UE may initiate the random selection of resources without sensing the communication medium prior to selection. For example, the first UE may select resources for a first transmission and resources for two retransmissions. In some aspects, the UE may perform the random resource selection after performing partial sensing for a short period of time following a transition into a wake up state. In other aspects, the first UE may perform the random resource selection immediately after transitioning into the wake-up state. The wake-up state transition may be triggered by detecting receipt of a packet transmission. In some aspects, the wake-up state may pertain to the powering on of the modem in the first UE from a sleep state (or powered off state) such that the application layer and/or the MAC layer may remain powered on independent of the modem. In some aspects, the MAC layer and/or application layer may facilitate the random resource selection while the modem is powered off (or in the sleep state). In some examples, the first UE may randomly select the first sidelink resources independent of the sensing operation, prior to the transitioning into the wake-up state. By allowing the first UE to perform random resource selection independent of any sensing operations, the first UE can reduce the amount of power consumption during the resource selection procedure.

There may be a time gap (or delay) between the first UE's selection of the resources and the first UE transmitting SCI 702 that reserves the resources at time t3. The time gap between t1 and t3 may be primarily due to the random nature of the selected resources, since the resources are typically required to be uniformly selected within the resource selection window. for processing by the first UE and/or preparing for transmission by the first UE. A second UE may select resources at time t2, and may have a shorter time gap between selection of the resources and transmission of SCI 704 that reserves the resources. As illustrated in FIG. 7, the second UE may transmit SCI 704 between the time at which the first UE selects the resources at t0 and the time at which the first UE reserves the resources at t3. FIG. 7 also illustrates that the second UE reserves resources that overlap with the resources selected by the first UE.

The first UE may monitor for the SCI from other UEs between the resource selection at time=t1 and a scheduled transmission (e.g., scheduled transmission of SCI 702 at t3 and/or transmission of resources indicated in the SCI 702). In some aspects, the first UE may receive, over a sidelink channel, the SCI 704 containing a resource reservation from the second UE. The resource reservation may indicate reservation of resources that includes at least a portion of the sidelink resources selected by the first UE.

A UE may perform a sidelink resource reevaluation for one or more slots when the resource reservation in the SCI 704 indicates the reservation of resources that includes at least a portion of the randomly selected resources of the first UE. In this regard, the UE may determine a potential collision with the randomly selected resources based on the resource reservation in the SCI 704 by determining that the reservation of resources indicates resources that at least partially overlap with the randomly selected resources of the first UE, e.g., when previously selected resources are already reserved in the SCI 704 for a transmission from the second UE. The earlier SCI 704 reserves the retransmission resources at 706 so that the first UE may not use the overlapping resources. A longer time gap between t0 and t3 may lead to a greater potential for selected resources to have intervening reservations by other UEs. In FIG. 7, the first UE may perform the sidelink resource reevaluation and may perform a resource reselection for the retransmission resources since the potential collision occurs in relation to the overlapping resources at 706. In this regard, the first UE may select second sidelink resources for the retransmission based on the resource reevaluation. For example, the first UE may adjust at least a portion of the first sidelink resources at 708 (e.g., including the overlapping resources at 706) by selecting new time/frequency resources for a first retransmission at 710.

At time t3, the first UE may transmit the first transmission along with the SCI 702 over a sidelink channel. The SCI 702 may be transmitted in at least a portion of the first transmission. The SCI 702 may indicate the second sidelink resources of the first UE.

Alternatively, or additionally, the UE may receive a configuration that includes information that the first UE may utilize to determine parameters of the resource reevaluation to employ. In some examples, the UE may receive RRC signaling, e.g., from a base station, an RSU, or a synchronization UE ("sync UE"). with configuration information for resource reevaluation. In some examples, the configuration may be received in part of an inter-UE RRC connection setup or update procedure. The configuration may include any of information on how often to sense (e.g., every slot, every other slot, etc.), information on how often to adjust resources, information on how often to determine to adjust, and/or information relating to a battery power threshold.

In some aspects, the configuration may indicate a number of slots to perform the resource reevaluation. For example, the first UE may perform the resource reevaluation on a per slot basis based on the number of slots indicated in the configuration. In another example, the first UE may perform the resource reevaluation on a non-consecutive slot basis based on the number of slots indicated in the configuration. If the first UE performs resource reevaluation at each slot, overlapping resources reserved by other UEs may be detected quickly, e.g., once the SCI is received, and the first UE may be able to react quickly to the updated channel occupancy. Resource reevaluation that is performed on a per slot basis may reduce latency and/or improve reliability by increasing the ability of the first UE to select resources with less interference.

In some aspects, the configuration may indicate a predetermined battery power threshold. The predetermined battery power threshold may correspond to a battery level of a UE that may include limited access (or restricted usage) of operation. For example, the first UE may obtain one or more measurements of a battery consumption level of the first UE and determine whether the battery consumption level of the first UE exceeds the predetermined battery power threshold. The first UE may compare its current battery level to the predetermined battery power threshold to determine whether the first UE is approaching restricted usage of operations. In some aspects, the first UE may determine a number of adjustments to the first sidelink resources based on the received configuration. For example, the first UE may be configured to adjust the randomly selected resources as many times a potential collision is detected by one or more received SCI from other sidelink UEs when the battery level of the first UE is sufficient to facilitate such operations. Otherwise, the first UE may be configured to adjust the randomly sidelink resources with a minimum number of adjustments (or after aggregating the number of potential collisions with the randomly selected resources) to preserve the power consumption of the first UE in performing such resource reevaluation and/or resource reselection operations when the battery level of the first UE may not support individual resource reevaluation and resource reselection operations at each potential collision instance. In some examples, the first UE may increase the number of adjustments to the first sidelink resources when the battery consumption level of the first UE exceeds the predetermined battery power threshold. In other examples, the first UE may decrease the number of adjustments to the first sidelink resources when the battery consumption level of the first UE does not exceed the predetermined battery power threshold. In other aspects, the first UE may select one or more time resources earliest in time independent of the sensing operation when the battery consumption level of the first UE does not exceed the predetermined battery power threshold. For example, the first UE may select resources in a first available slot than in a subsequent slot as the monitoring of the subsequent slots may require additional power consumption.

Figure 8:
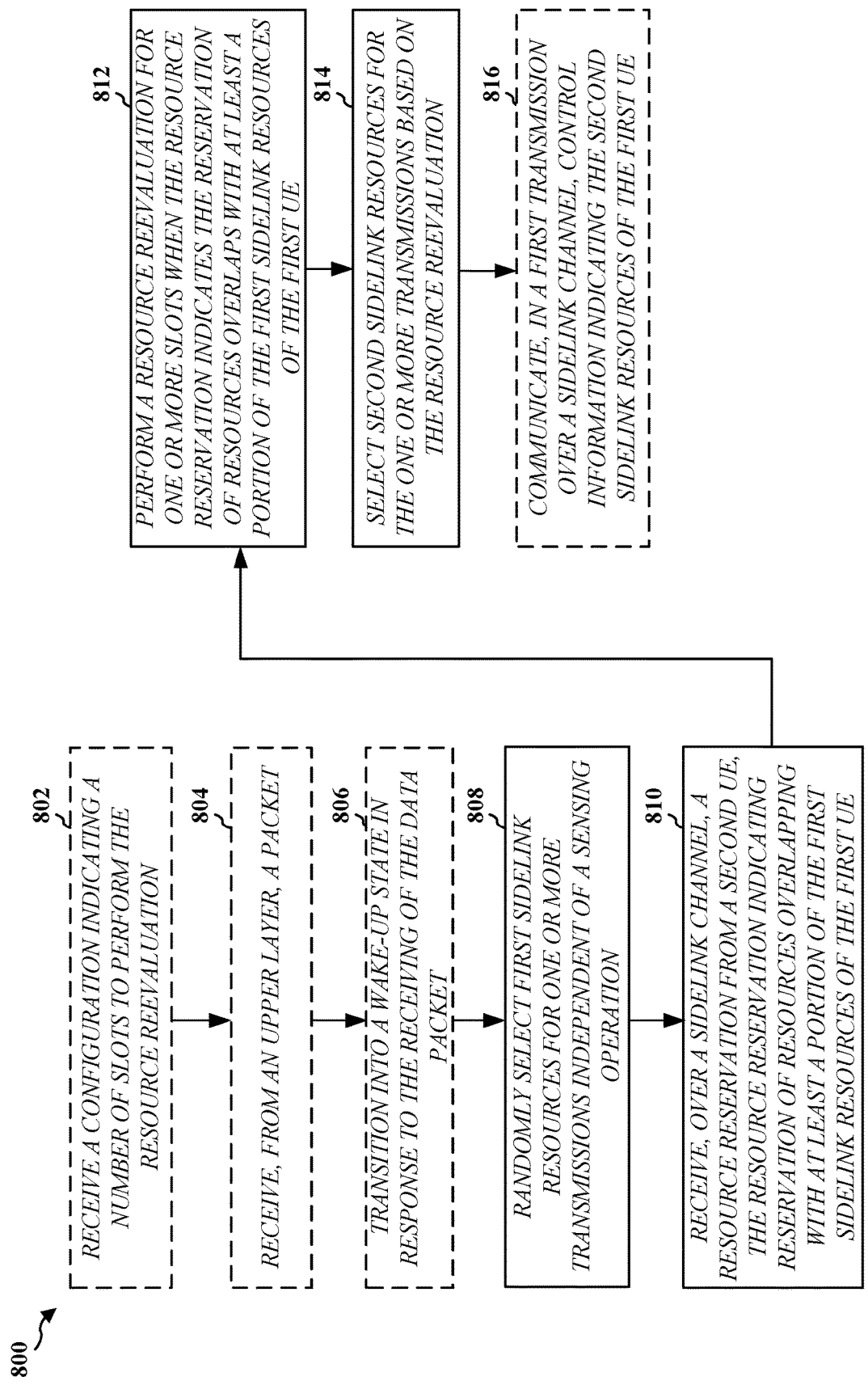
FIG. 8 is an example flowchart of a method of wireless communication including on-demand sensing based on sidelink resource reevaluation.

FIG. 8 is a flowchart of a process 800 of wireless communication. The process 800 may be performed by a wireless communication device (e.g., the UE 104, 402, 504, 506, 508; the device 410 or 450, the RSU 107, 507, which may include memory, a cellular baseband processor, and one or more components configured to perform the process 800). As illustrated, the process 800 includes a number of enumerated steps, but embodiments of the process 800 may include additional steps before, after, and in between the enumerated steps. In some embodiments, one or more of the enumerated steps may be omitted or performed in a different order. Optional aspects are illustrated with a dashed line. The process 800 enables a wireless communication device to randomly select resource without performing a sensing operation (and/or partial sensing prior to selection of resources) and perform the on-demand sensing based on resource reevaluation. Thus, the mechanism may reduce power consumption of UEs while increasing reliability of resource selection in sidelink communication. The process 800 enables the wireless communication device to perform on-demand sensing based on sidelink resource reevaluation.

At 802, a first wireless communication device may receive a configuration indicating a number of slots to perform the resource reevaluation. The first wireless communication device may receive the configuration, e.g., as described in connection with FIG. 7. The configuration may be received, e.g., by the configuration processing component 946 via the reception component 930 of the apparatus 902 in FIG. 9. In some examples, the first wireless communication device may be configured with an algorithm to use for resource reevaluation. For example, the first wireless communication device may perform the resource reevaluation on a per slot basis based on the number of slots indicated in the configuration. In another example, the first wireless communication device may perform the resource reevaluation on a non-consecutive slot basis, such as every other slot or other non-consecutive sequence of slots, based on the number of slots indicated in the configuration. In other aspects, at 802, the first wireless communication device may receive a configuration indicating a predetermined battery power threshold, where the first wireless communication device may monitor its battery power level and compare against the predetermined battery power threshold. The first wireless communication device may adjust how frequent it adjusts the selected resources and/or how frequent it performs the resource reevaluation depending on its remaining battery power level relative to the predetermined battery power threshold. For example, the first wireless communication device may determine a number of adjustments to the first sidelink resources based on the configuration, such that the first wireless communication device may increase the number of adjustments to the first sidelink resources when the battery consumption level of the first UE exceeds the predetermined battery power threshold or may decrease the number of adjustments to the first sidelink resources when the battery consumption level of the first UE does not exceed the predetermined battery power threshold. In some aspects, the first wireless communication device may randomly select one or more time resources earliest in time independent of the sensing operation when the battery consumption level of the first UE does not exceed the predetermined battery power threshold.

At 804, the first wireless communication device may receive, from one or more upper layers, a packet. The first wireless communication device may receive the packet, e.g., as described in connection with FIG. 7. The packet may be received, e.g., by the sidelink communication manager 932 via the reception component 930 of the apparatus 902 in FIG. 9.

At 806, the first wireless communication device may transition into a wake-up state in response to the receiving of the packet transmission. The first wireless communication device may transition into the wake-up state, e.g., as described in connection with FIG. 7. The transition into the wake-up state may be performed, e.g., by the state transition component 948 of the apparatus 902 in FIG. 9.

At 808, the first wireless communication device may randomly select first sidelink resources for one or more transmissions independent of a sensing operation. In some examples, the first sidelink resources include one or more resources for a first transmission and one or more resources for one or more retransmissions. In some aspects, the first wireless communication device may randomly select the first sidelink resources independent of the sensing operation, immediately following the receiving of the packet. In other aspects, the first wireless communication device may randomly select the first sidelink resources independent of the sensing operation, immediately following the transitioning into the wake-up state. In some aspects, the first wireless communication device may randomly select the first sidelink resources independent of the sensing operation, prior to the transitioning into the wake-up state. In some aspects, the first wireless communication device may randomly select one or more time resources earliest in time independent of the sensing operation when the battery consumption level of the first UE does not exceed the predetermined battery power threshold, e.g., as described in connection with block 802. The first wireless communication device may perform the random resource selection, e.g., as described in connection with FIGS. 5-7. The first sidelink resources may be randomly selected, e.g., by the sidelink resource selection component 940 of the apparatus 902 in FIG. 9.

In other implementations, the first wireless communication device may perform partial sensing on first sidelink resources for one or more transmissions. In some aspects, the first wireless communication device may partially sense on the first sidelink resources prior to selection, and immediately following the receiving of the packet. In other aspects, the first wireless communication device may partially sense on the first sidelink resources prior to selection, and immediately following the transitioning into the wake-up state. In some aspects, the first wireless communication device may partially sense on the first sidelink resources prior to selection, and prior to the transitioning into the wake-up state. In some aspects, the first wireless communication device may partially sense one or more time resources earliest in time prior to selection when the battery consumption level of the first UE does not exceed the predetermined battery power threshold.

At 810, the first wireless communication device may receive, over a sidelink channel, a resource reservation from a second wireless communication device. In some aspects, the resource reservation may indicate reservation of resources that overlaps with at least a portion of the first sidelink resources of the first wireless communication device. In some aspects, the first wireless communication device may receive sidelink control information from the second wireless communication device, in which the sidelink control information indicates the resource reservation of the second wireless communication device. In some examples, the resource reservation may be included in a resource reservation field of the sidelink control information. The first wireless communication device may receive the resource reservation, e.g., as described in connection with FIGS. 5-7. The resource reservation may be received, e.g., by the resource reservation processing component 942 via the reception component 930 of the apparatus 902 in FIG. 9.

At 812, the first wireless communication device may perform a resource reevaluation for one or more slots between the time the resources were selected and the time of a first transmission, when the resource reservation indicates the reservation of resources that overlaps with at least a portion of the first sidelink resources of the first wireless communication device. In some aspects, the first wireless communication device may determine whether to adjust one or more resources relating to a first transmission and/or one or more resources relating to one or more retransmissions based on the resource reservation of the second wireless communication device. The first wireless communication device may perform the resource reevaluation, e.g., as described in connection with FIGS. 6 and 7. The resource reevaluation may be performed, e.g., by the resource reevaluation component 944 of the apparatus 902 in FIG. 9.

At 814, the first wireless communication device may select second sidelink resources for the one or more transmissions based on the resource reevaluation. In some aspects, the first wireless communication device may select the second sidelink resources by at least adjusting at least a portion of the first sidelink resources into the second sidelink resources. This may include reselecting new time and/or frequency resources for a first transmission, reselecting new time and/or frequency resources for each retransmission, or a combination thereof. The first wireless communication device may perform the resource reselection, e.g., as described in connection with FIGS. 6 and 7. The second sidelink resources may be selected, e.g., by the sidelink resource selection component 940 of the apparatus 902 in FIG. 9. In other aspects, the second sidelink resources may be selected, e.g., by the sidelink resource selection component 940 with coordination with the resource reevaluation component 944 of the apparatus 902 in FIG. 9.

At 816, the first wireless communication device may communicate, in a first transmission over a sidelink channel, control information indicating the second sidelink resources of the first wireless communication device. In various aspects, the first wireless communication device may select the second sidelink resources based on the resource reevaluation occurs prior to a first transmission of the first wireless communication device. The first wireless communication device may communicate the first transmission, e.g., as described in connection with FIGS. 5-7. The control information may be transmitted, e.g., by the control information generation component 950 via the transmission component 934 of the apparatus 902 in FIG. 9.

A wireless apparatus may include components that perform each of the blocks of the algorithm in the aforementioned flowchart of FIG. 8. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus for wireless communication may include means for performing any of the blocks of the process described in connection with FIG. 8. The aforementioned means may be one or more of the aforementioned components of the apparatus and/or a processing system of the apparatus configured to perform the functions recited by the aforementioned means. The processing system may include the TX processor 416, 468, the RX processor 470, 456, and the controller/processor 475, 459. As such, in one configuration, the aforementioned means may be the TX processor 416, 468, the RX processor 470, 456, and the controller/processor 475, 459 configured to perform the functions recited by the aforementioned means.

Figure 9:
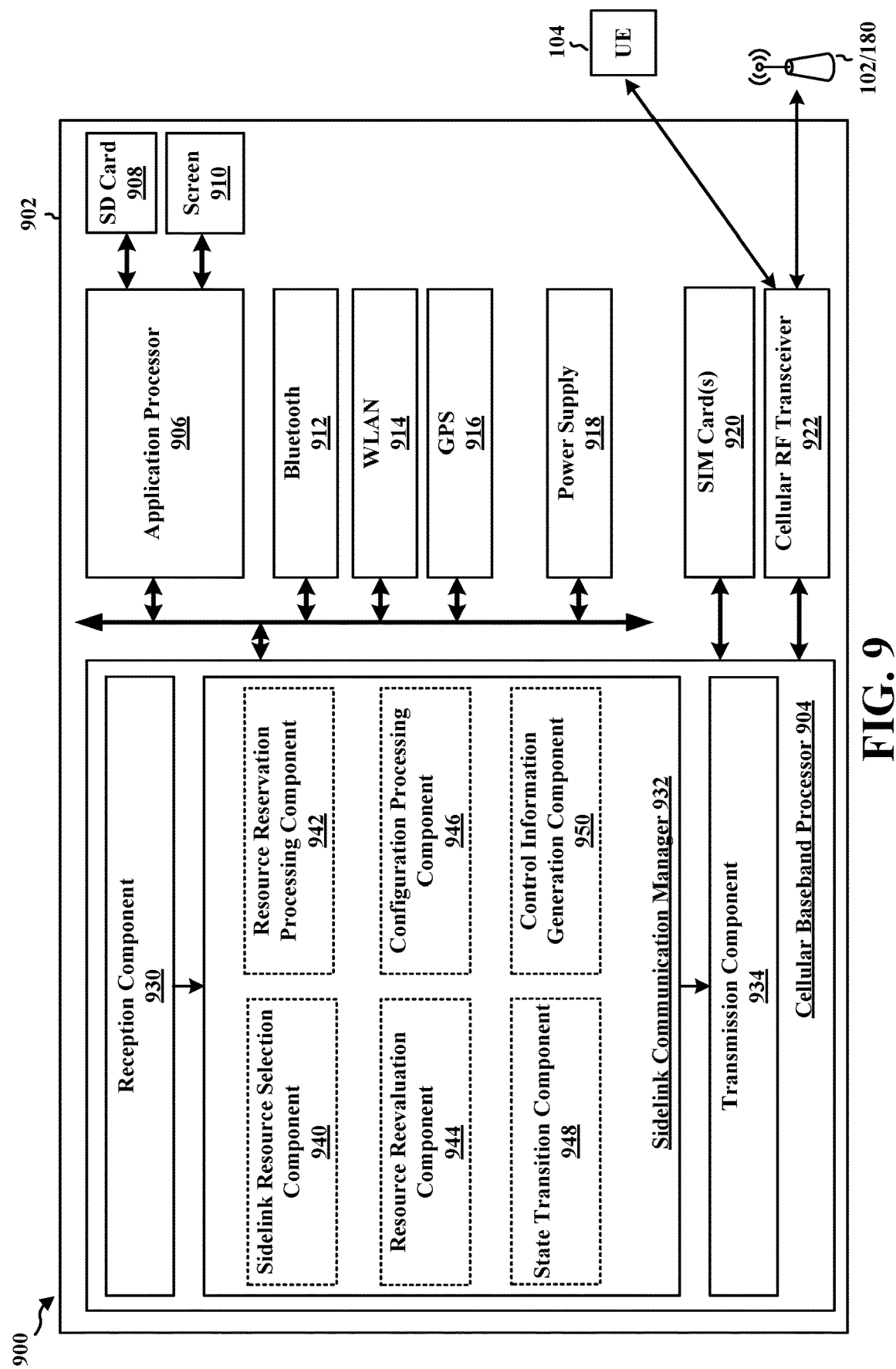
FIG. 9 is a diagram illustrating an example of a hardware implementation for an example apparatus.

FIG. 9 is a diagram 900 illustrating an example of a hardware implementation for an apparatus 902. The apparatus 902 may be a UE or other wireless device that communicates based on sidelink. The apparatus 902 includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with other wireless devices, such as a UE 94 and/or base station 92/180. The cellular baseband processor 904 may include a computer-readable medium/memory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a sidelink communication manager 932, and a transmission component 934. The sidelink communication manager 932 includes the one or more illustrated components. The components within the sidelink communication manager 932 may be stored in the computer-readable medium/memory and/or configured as hardware within the cellular baseband processor 904. The cellular baseband processor 904 may be a component of the device 410 or 450 and may include the memory 460 or 476 and/or at least one of the TX processor 416 or 468, the RX processor 456 or 470, and the controller/processor 459 or 475. In one configuration, the apparatus 902 may be a modem chip and include just the baseband processor 904, and in another configuration, the apparatus 902 may be the entire wireless device (e.g., see the device 410 or 450 of FIG. 4) and include the additional modules of the apparatus 902.

The sidelink communication manager 932 includes a sidelink resource selection component 940, a resource reservation processing component 942, a resource reevaluation component 944, a configuration processing component 946, a state transition component 948, and/or a control information generation component 950 configured to perform the aspects described in connection with the process in FIG. 8. The apparatus is illustrated as including components to perform the process of FIG. 8, because the wireless device may operate as a transmitting device at times and may operate as a receiving device at other times.

The apparatus 902 may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for selecting first sidelink resources for one or more transmissions based on one or more of a partial sensing operation prior to selection or selection of resources independent of a sensing operation. The apparatus 902 may also include means for receiving, over a sidelink channel, a resource reservation from a second UE, the resource reservation indicating reservation of resources overlapping with at least a portion of the first sidelink resources of the first UE. The apparatus 902 may further include means for performing a resource reevaluation for one or more slots when the resource reservation indicates that the reservation of resources overlaps with the at least a portion of the first sidelink resources of the first UE. The apparatus 902 may further include means for selecting second sidelink resources for the one or more transmissions based on the resource reevaluation.

The aforementioned means may be one or more of the aforementioned components of the apparatus 902 configured to perform the functions recited by the aforementioned means. As described supra, the apparatus 902 may include the TX Processor 416 or 468, the RX Processor 456 or 470, and the controller/processor 459 or 475. As such, in one configuration, the aforementioned means may be the TX Processor 416 or 468, the RX Processor 456 or 470, and the controller/processor 459 or 475 configured to perform the functions recited by the aforementioned means.

The following aspects are illustrative only and aspects thereof may be combined with aspects of other examples or teaching described herein, without limitation.

Aspect 1 is a method of wireless communication at a first UE, comprising: selecting first sidelink resources for one or more transmissions based on one or more of a partial sensing operation prior to selection or selection of resources independent of a sensing operation; receiving, over a sidelink channel, a resource reservation from a second UE, the resource reservation indicating reservation of resources comprising at least a portion of the first sidelink resources of the first UE; performing a resource reevaluation for one or more slots when the resource reservation indicates with the reservation of resources comprising the at least a portion of the first sidelink resources of the first UE; and selecting second sidelink resources for the one or more transmissions based on the resource reevaluation.

In Aspect 2, the method of Aspect 1 further includes receiving, from an upper layer, a packet, wherein the selecting the first sidelink resources comprises randomly selecting the first sidelink resources independent of the sensing operation or partially sensing on the first sidelink resources prior to selection, immediately following the receiving of the packet transmission.

In Aspect 3, the method of Aspect 1 or Aspect 2 further includes receiving, from an upper layer, a packet; and transitioning into a wake-up state in response to the receiving of the packet.

In Aspect 4, the method of any of Aspects 1-3 further includes that the selecting the first sidelink resources comprises randomly selecting the first sidelink resources independent of the sensing operation or partially sensing on the first sidelink resources prior to selection, immediately following the transitioning into the wake-up state.

In Aspect 5, the method of any of Aspects 1-3 further includes that the selecting the first sidelink resources comprises randomly selecting the first sidelink resources independent of the sensing operation or partially sensing on the first sidelink resources prior to selection, prior to the transitioning into the wake-up state.

In Aspect 6, the method of any of Aspects 1-5 further includes communicating, in a first transmission over a sidelink channel, control information indicating the second sidelink resources of the first UE.

In Aspect 7, the method of any of Aspects 1-6 further includes receiving a configuration indicating a number of slots to perform the resource reevaluation.

In Aspect 8, the method of any of Aspects 1-7 further includes that the performing the resource reevaluation comprises performing the resource reevaluation on a per slot basis based on the number of slots indicated in the configuration.

In Aspect 9, the method of any of Aspects 1-7 further includes that the performing the resource reevaluation comprises performing the resource reevaluation on a non-consecutive slot basis based on the number of slots indicated in the configuration.

In Aspect 10, the method of any of Aspects 1-7 further includes that the configuration indicates a predetermined battery power threshold, further comprising: obtaining one or more measurements of a battery consumption level of the first UE; and determining whether the battery consumption level of the first UE exceeds the predetermined battery power threshold.

In Aspect 11, the method of any of Aspects 1-10 further includes determining a number of adjustments to the first sidelink resources based on the configuration; increasing the number of adjustments to the first sidelink resources when the battery consumption level of the first UE exceeds the predetermined battery power threshold; and decreasing the number of adjustments to the first sidelink resources when the battery consumption level of the first UE does not exceed the predetermined battery power threshold.

In Aspect 12, the method of any of Aspects 1-10 further includes that the selecting the first sidelink resources comprises selecting one or more time resources earliest in time independent of the sensing operation when the battery consumption level of the first UE does not exceed the predetermined battery power threshold.

In Aspect 13, the method of any of Aspects 1-12 further includes that the receiving the resource reservation comprises receiving sidelink control information from the second UE, the sidelink control information indicating the resource reservation of the second UE.

In Aspect 14, the method of any of Aspects 1-13 further includes that the selecting the second sidelink resources comprises adjusting at least a portion of the first sidelink resources into the second sidelink resources.

In Aspect 15, the method of any of Aspects 14 further includes that the first sidelink resources comprises one or more resources for a first transmission and one or more resources for one or more retransmissions, and the performing the resource reevaluation comprises determining whether to adjust the one or more resources of the first transmission or the one or more resources of the one or more retransmissions based on the resource reservation of the second UE.

In Aspect 16, the method of any of Aspects 1-15 further includes that the selecting the second sidelink resources based on the resource reevaluation occurs prior to a first transmission of the first UE.

Aspect 17 is a device including one or more processors and one or more memories in electronic communication with the one or more processors storing instructions executable by the one or more processors to cause the device to implement a method as in any of Aspects 1-16.

Aspect 18 is a system or apparatus including means for implementing a method or realizing an apparatus as in any of Aspects 1-16.

Aspect 19 is a non-transitory computer readable medium storing instructions executable by one or more processors to cause the one or more processors to implement a method as in any of Aspects 1-16.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
   selecting first sidelink resources for one or more transmissions based on one or more of partial sensing or resource selection independent of a sensing operation;
   receiving, over a sidelink channel, a resource reservation from a second UE, the resource reservation indicating a reservation of resources overlapping with at least a portion of the first sidelink resources of the first UE;
   performing a resource reevaluation for one or more slots when the resource reservation indicates the reservation of resources overlaps with the at least a portion of the first sidelink resources of the first UE, wherein the performing the resource reevaluation comprises performing the resource reevaluation on a non-consecutive slot basis based on a number of slots to perform the resource reevaluation; and
   selecting second sidelink resources for the one or more transmissions based on the resource reevaluation.

2. The method of claim 1, further comprising:
   receiving, from an upper layer, a packet,
   wherein the selecting the first sidelink resources comprises randomly selecting the first sidelink resources independent of the sensing operation or partially sensing on the first sidelink resources prior to selection, in response to the receiving of the packet.

3. The method of claim 1, further comprising:
   receiving, from an upper layer, a packet; and
   transitioning into a wake-up state in response to the receiving of the packet.

4. The method of claim 3, wherein the selecting the first sidelink resources comprises randomly selecting the first sidelink resources independent of the sensing operation or partially sensing on the first sidelink resources prior to selection, in response to the transitioning into the wake-up state.

5. The method of claim 3, wherein the selecting the first sidelink resources comprises randomly selecting the first sidelink resources independent of the sensing operation or partially sensing on the first sidelink resources prior to selection, prior to the transitioning into the wake-up state.

6. The method of claim 1, further comprising:
   communicating, in a first transmission over a sidelink channel, control information indicating the second sidelink resources of the first UE.

7. The method of claim 1, further comprising:
   receiving a configuration indicating the number of slots to perform the resource reevaluation.

8. The method of claim 1, further comprising:
   obtaining one or more measurements of a battery consumption level of the first UE; and
   determining whether the battery consumption level of the first UE exceeds a battery power threshold.

9. The method of claim 8, further comprising:
   determining a number of adjustments to the first sidelink resources;
   increasing the number of adjustments to the first sidelink resources when the battery consumption level of the first UE exceeds the battery power threshold; and decreasing the number of adjustments to the first sidelink resources when the battery consumption level of the first UE does not exceed the battery power threshold.

10. The method of claim 8, wherein the selecting the first sidelink resources comprises selecting one or more time resources earliest in time independent of the sensing operation when the battery consumption level of the first UE does not exceed the battery power threshold.

11. The method of claim 1, wherein the receiving the resource reservation comprises receiving sidelink control information from the second UE, the sidelink control information indicating the resource reservation of the second UE.

12. The method of claim 1, wherein the selecting the second sidelink resources comprises adjusting at least a portion of the first sidelink resources into the second sidelink resources.

13. The method of claim 1, wherein:
the first sidelink resources comprises one or more resources for a first transmission and one or more resources for one or more retransmissions, and
the performing the resource reevaluation comprises determining whether to adjust the one or more resources of the first transmission or the one or more resources of the one or more retransmissions based on the resource reservation of the second UE.

14. The method of claim 1, wherein the selecting the second sidelink resources based on the resource reevaluation occurs prior to a first transmission of the first UE.

15. An apparatus for wireless communication at a first user equipment (UE), the apparatus comprising:
at least one processor; and
a memory, coupled to the at least one processor, storing code executable by the at least one processor to cause the apparatus to:
select first sidelink resources for one or more transmissions based on one or more of partial sensing or resource selection independent of a sensing operation;
receive, over a sidelink channel, a resource reservation from a second UE, the resource reservation indicating a reservation of resources overlapping with at least a portion of the first sidelink resources of the first UE;
perform a resource reevaluation for one or more slots when the resource reservation indicates the reservation of resources overlaps with the at least a portion of the first sidelink resources of the first UE, wherein the performing the resource reevaluation comprises performing the resource reevaluation on a non-consecutive slot basis based on a number of slots to perform the resource reevaluation; and
select second sidelink resources for the one or more transmissions based on the resource reevaluation.

16. The apparatus of claim 15, further comprising:
receiving, from an upper layer, a packet,
wherein the selecting the first sidelink resources comprises randomly selecting the first sidelink resources independent of the sensing operation or partially sensing on the first sidelink resources prior to selection, in response to the receiving of the packet transmission.

17. The apparatus of claim 15, further comprising:
receiving, from an upper layer, a packet; and
transitioning into a wake-up state in response to the receiving of the packet transmission.

18. The apparatus of claim 17, wherein the selecting the first sidelink resources comprises randomly selecting the first sidelink resources independent of the sensing operation or partially sensing on the first sidelink resources prior to selection, in response to the transitioning into the wake-up state.

19. The apparatus of claim 17, wherein the selecting the first sidelink resources comprises randomly selecting the first sidelink resources independent of the sensing operation or partially sensing on the first sidelink resources prior to selection, prior to the transitioning into the wake-up state.

20. The apparatus of claim 15, further comprising:
communicating, in a first transmission over a sidelink channel, control information indicating the second sidelink resources of the first UE.

21. The apparatus of claim 15, further comprising:
obtaining one or more measurements of a battery consumption level of the first UE; and
determining whether the battery consumption level of the first UE exceeds a battery power threshold.

22. The apparatus of claim 21, further comprising:
determining a number of adjustments to the first sidelink resources;
increasing the number of adjustments to the first sidelink resources when the battery consumption level of the first UE exceeds the battery power threshold; and
decreasing the number of adjustments to the first sidelink resources when the battery consumption level of the first UE does not exceed the battery power threshold.

23. The apparatus of claim 21, wherein the selecting the first sidelink resources comprises selecting one or more time resources earliest in time independent of the sensing operation when the battery consumption level of the first UE does not exceed the battery power threshold.

24. The apparatus of claim 15, wherein the receiving the resource reservation comprises receiving sidelink control information from the second UE, the sidelink control information indicating the resource reservation of the second UE.

25. The apparatus of claim 15, wherein the selecting the second sidelink resources comprises adjusting at least a portion of the first sidelink resources into the second sidelink resources, wherein the selecting the second sidelink resources based on the resource reevaluation occurs prior to a first transmission of the first UE.

26. The apparatus of claim 15, wherein:
the first sidelink resources comprises one or more resources for a first transmission and one or more resources for one or more retransmissions, and
the performing the resource reevaluation comprises determining whether to adjust the one or more resources of the first transmission or the one or more resources of the one or more retransmissions based on the resource reservation of the second UE.

27. An apparatus for wireless communication at a first user equipment (UE), the apparatus comprising:
means for selecting first sidelink resources for one or more transmissions based on one or more of partial sensing or resource selection independent of a sensing operation;
means for receiving, over a sidelink channel, a resource reservation from a second UE, the resource reservation indicating a reservation of resources overlapping with at least a portion of the first sidelink resources of the first UE;
means for performing a resource reevaluation for one or more slots when the resource reservation indicates the reservation of resources overlaps with the at least a portion of the first sidelink resources of the first UE, wherein the performing the resource reevaluation comprises performing the resource reevaluation on a non-consecutive slot basis based on a number of slots to perform the resource reevaluation; and means for selecting second sidelink resources for the one or more transmissions based on the resource reevaluation.

28. A non-transitory computer-readable medium storing computer executable code for wireless communication, the code when executed by at least one processor, causes a first user equipment (UE) to:

select first sidelink resources for one or more transmissions based on one or more of partial sensing or resource selection independent of a sensing operation;

receive, over a sidelink channel, a resource reservation from a second UE, the resource reservation indicating a reservation of resources overlapping with at least a portion of the first sidelink resources of the first UE;

perform a resource reevaluation for one or more slots when the resource reservation indicates the reservation of resources overlaps with the at least a portion of the first sidelink resources of the first UE, wherein the performing the resource reevaluation comprises performing the resource reevaluation on a non-consecutive slot basis based on a number of slots to perform the resource reevaluation; and select second sidelink resources for the one or more transmissions based on the resource reevaluation.

* * * * *